Nov. 14, 1933.  G. E. WHITE  1,934,958
ELECTRIC FLUID HEATER TEMPERATURE CONTROL
Filed July 30, 1932
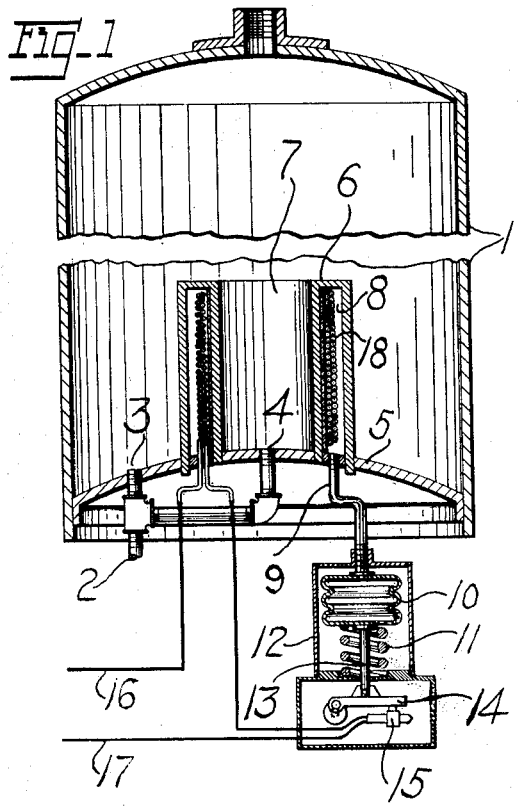
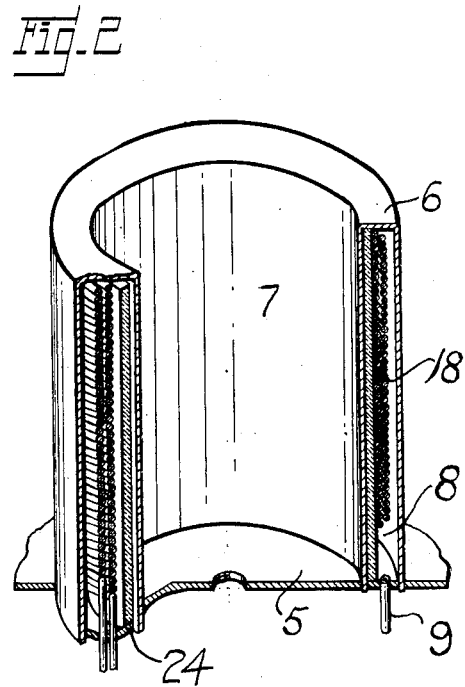
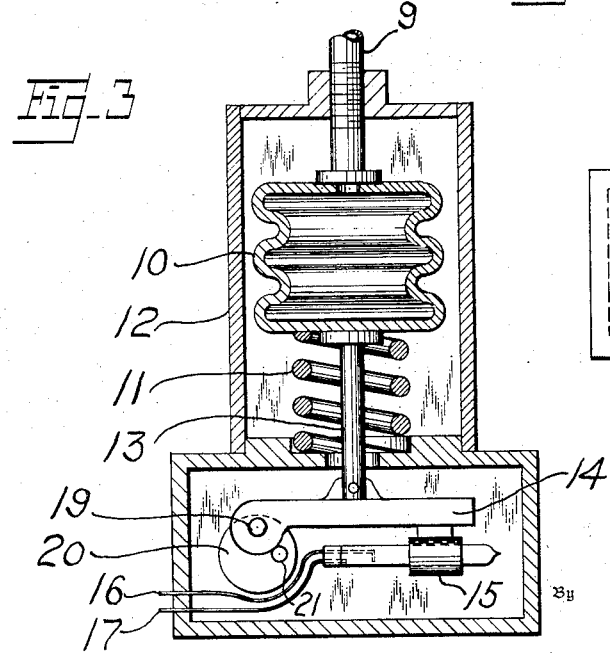
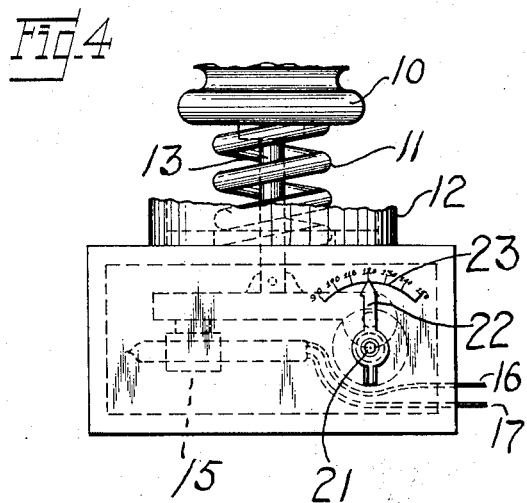
Inventor
Gerald E. White
By Samuel H. Davis
Attorney Patented Nov. 14, 1933

1,934,958

UNITED STATES PATENT OFFICE 1,934,958

ELECTRIC FLUID HEATER TEMPERATURE CONTROL

Gerald E. White, Lansing, Mich.

Application July 30, 1932. Serial No. 626,995

5 Claims. (Cl. 219—39)

This invention relates to electric fluid heater temperature controls most commonly used in connection with electric water heaters, and is intended as an improvement of the apparatus for like purposes illustrated and described in Letters Patent of the United States issued to this applicant and numbered 1,854,322, dated April 19, 1932.

The primary object of this improvement is believed to be attained by the special construction and arrangement herein set forth and claimed, which is thought to create a heat controlled device which will be sure of operation independent of the temperature of the water or matter to be heated by the heating devices. There is a controlling device which controls the temperature of the heating unit itself. By this means the heating unit will be protected from excessively high temperatures thus insuring a long life free from interrupted service. A controlling device fashioned according to this invention will, it is believed, accomplish the stated objects for the following reasons: The enclosed chamber which may be an integral part of the heating tank is provided with an enclosed compartment, which may be an integral part of the chamber or heating unit or so closely adjacent to the heating unit as to maintain the temperature in direct proportion to that of the heating unit irrespective of the temperature of the water or matter which the unit is heating. The said enclosed compartment is to contain a liquid or a gas or both, which will expand or contract in accordance with the temperature of the heating unit. The expansion or contraction of the liquid or gas can be made to move a bellows diaphragm or similar device, or other arrangement, which can be constructed to make and break an electric circuit which will control the temperature of the heating unit. A very close control of the temperature of the heated water or other matter can be maintained by this type of control without the use of very delicate mechanism, because of the fact that the enclosed compartment of the chamber containing the expanded liquid or gas will when the heating unit is in operation, be at a higher temperature than the water or matter being heated. The results will be that when the electric current supplying the unit is disconnected or interrupted the temperature of the enclosed compartment can drop to that of the heated water without any drop in the temperature of the water itself. This will cause the expanded liquid or gas to contract and the controlling device can be so adjusted that any further decrease in the temperature will cause it to operate and close the electrical circuit, and by this means a very close temperature control can be maintained.

It will be seen that if for any reason the water or matter being heated by the unit be drained away from the unit the controlling devices will continue to operate and protect the unit from excessive temperatures. If the heating surface of the unit becomes covered with lime or scale so that the heat cannot be conducted to the water as rapidly as it should, the controlling device will protect the unit and prevent it from becoming overheated.

The special construction and combination of the parts of this invention are illustrated in the accompanying drawing, of which Fig. 1 represents a vertical sectional view of all parts assembled. Fig. 2 is a vertical sectional view of the heating chamber or box and the enclosed compartment therein. Fig. 3 is a vertical sectional view of the diaphragm box and switch case. Fig. 4 shows the dial, adjustment pointer and scale on the case.

Throughout the description and drawing the same number is used to refer to the same part.

Considering the drawing, a tank 1 of any chosen form has a discharge pipe 2 with branches 3 and 4 passing through the bottom 5 of the tank. Erected on the bottom 5 is the heating unit or chamber 6, usually formed with a vertical central passage 7. This invention is not limited to the particular shape of the chamber 6. Formed with the chamber or adjacent thereto is a compartment 8, and from the compartment extends a tube 9 to an expansible diaphragm 10, which may be collapsed by the spring 11, both within the diaphragm box 12. The spring surrounds a rod 13 attached to the diaphragm, and the rod is connected with a pivoted switch arm 14 carrying a mercury switch 15. The conductors 16 and 17 are shown connected with the switch. The conducductors lead likewise to coils 18 as best shown in Fig. 1. Switch arm 14 is supported upon a pivot 19 carried by a revoluble disk 20 on arbor 21, which as best shown in Fig. 4 carries the pointer 22 arranged to sweep scale 23. The coil 18 may be wound upon a glass or other partition 24 in the compartment 8.

The operation is thought to be manifest from the drawing and explanation. Branch tubes 3 and 4 drain the tank into the tube 2, branch 4 taking fluid from the vertical passage 7.

As shown in Fig. 3, disk 20 may be an eccentric, and in the Fig. 4 the pointer occupies a middle position upon the scale. Let it be assumed that the pointer in Fig. 4 is turned to the left to 90° of the scale. Pivot 19 would be raised and arm 14 tilted down. The mercury in switch 15 would run from the contacts and the circuit would be broken. If, however, coil 18 and its compartment 8 cooled down, the contracting diaphragm will tilt the switch arm up and re-establish the current. The arm will be tilted down again as the heat increases and the current again interrupted, so that the temperature will be kept at approximately the desired 90°.

Conversely, if the pointer in Fig. 4 is turned to the right, the disk will carry the pivot of the switch arm downwardly as will be readily seen from Fig. 3, and its free end will be tilted upwardly causing the mercury to run to the contacts of the conductors 16 and 17. The heating will increase and will continue until such a temperature is reached as will so expand the diaphragm as to force the end down sufficiently to break the circuit. As the parts are designed and associated this breaking of the circuit will occur before excessively overheating the coil or chamber, and the heat of the chamber and coil will fall to that of the water in the tank. The various parts illustrated and described are carefully proportioned, and the desired temperature may be closely regulated to any degree of the scale.

Having now described this invention and the manner of its use, I claim:—

1. In an electric fluid heater temperature control, the combination with a tank, of a heating chamber therein, an electrically energized coil, the said chamber having a compartment for the reception of the coil, the said chamber having a vertical fluid passage, the said tank having tubes connected with the interior of the tank outside said heating chamber and with the vertical passage thereof, an expansible diaphragm device, a tube connecting said compartment of the chamber and the said diaphragm, an electric switch controlled by the movements of the diaphragm whereby the contraction of the diaphragm impresses a closing movement upon the switch, and means for regulating the opening and closing of the switch with respect to the expansion and contraction of the diaphragm.

2. In an electric fluid heater temperature control, the combination with a tank, of a heating chamber therein, an electrically energized coil, the said chamber having a compartment for the reception of the coil, an expansible diaphragm device, a tube connecting said compartment and the said diaphragm, an electric switch controlled by the movements of the diaphragm, said switch being constructed to open and close by a tilting movement whereby the contraction of the diaphragm impresses a tilting closing movement upon the switch, and means for regulating the tilting movements of the switch with respect to the expansion and contraction of the diaphragm.

3. In an electric fluid heater temperature control, the combination with a tank, of a heating chamber therein, an electrically energized coil, the said chamber having a compartment for the reception of the coil, an expansible diaphragm device, a tube connecting said compartment and the said diaphragm, a tilting electric mercury switch controlled by the movements of the diaphragm whereby the contraction of the diaphragm impresses a tilting closing movement upon the switch, and means for regulating the opening and closing tilting movements of the switch with respect to the expansion and contraction of the diaphragm.

4. In an electric fluid heater temperature control, the combination with a tank, of a heating chamber therein, the said chamber having a compartment, an electrically energized coil in the said compartment, the said chamber having a vertical passage, the said tank having tubes connected with the interior of the tank outside the heating chamber and with the vertical passage thereof, an expansible diaphragm device, a tube connecting the said compartment of the chamber and the said diaphragm, a tilting mercury electric switch, a pivoted arm carrying the switch and controlled by the movements of the diaphragm whereby the contraction of the diaphragm impresses a tilting closing movement upon the switch, means for adjusting the pivotal support of said arm and regulating the opening and closing movements of the switch with respect to the expansion and contraction of the diaphragm, and a scale and pointer for indicating the temperature in accordance with the position of the pivot of said switch arm.

5. In an electric fluid heater temperature control, the combination with a tank, of a heating chamber therein having a compartment, an electrically energized coil arranged to heat the said compartment and the walls of said chamber, the said chamber having a vertical passage, tubular means connecting the interior of the tank outside the heating chamber with the said vertical passage, an expansible diaphragm device, a tube connecting said compartment and the diaphragm whereby the expansion by heat of the contents of said compartment and the contraction thereof are communicated to the diaphragm, a rod attached to the said diaphragm, an electric switch device having an arm pivotally attached to the said rod, revoluble means pivotally connected with said arm and adapted to adjust the inclinatory position of the arm, a pointer actuated by the movement of said revoluble means, and a scale arranged to be swept by said pointer.

GERALD E. WHITE.